US011614372B2

(12) United States Patent
Scott

(10) Patent No.: US 11,614,372 B2
(45) Date of Patent: Mar. 28, 2023

(54) LOAD SENSOR SYSTEM WITH IMPROVED ASSEMBLY CONNECTION

(71) Applicant: Driving Innovations, LLC, Paradox, CO (US)

(72) Inventor: Timothy James Scott, Paradox, CO (US)

(73) Assignee: Driving Innovations, LLC, Paradox, CO (US)

( * ) Notice: Subject to any disclaimer, the term of this patent is extended or adjusted under 35 U.S.C. 154(b) by 0 days.

(21) Appl. No.: 17/869,899

(22) Filed: Jul. 21, 2022

(65) Prior Publication Data

US 2022/0357222 A1    Nov. 10, 2022

Related U.S. Application Data

(63) Continuation of application No. 16/410,861, filed on May 13, 2019, now Pat. No. 11,397,116.

(51) Int. Cl.
*G01L 1/22* (2006.01)
*B60G 15/02* (2006.01)
*G01G 19/12* (2006.01)

(52) U.S. Cl.
CPC ............ *G01L 1/2293* (2013.01); *B60G 15/02* (2013.01); *G01G 19/12* (2013.01); *B60G 2204/41* (2013.01)

(58) Field of Classification Search
None
See application file for complete search history.

(56) References Cited

U.S. PATENT DOCUMENTS

| 3,498,114 | A | * | 3/1970 | Garber ................. G01D 5/2258 73/661 |
| 4,359,716 | A | | 11/1982 | Miyamaru et al. |
| 4,800,751 | A | | 1/1989 | Kobayashi et al. |
| 5,009,401 | A | * | 4/1991 | Weitzenhof ............... F16F 9/05 280/124.157 |
| 5,814,771 | A | * | 9/1998 | Oakes .................... G01G 23/48 177/136 |
| 5,825,284 | A | | 10/1998 | Dunwoody et al. |
| 6,418,360 | B1 | * | 7/2002 | Spivey .................. G01M 17/04 73/11.04 |
| 9,452,657 | B1 | * | 9/2016 | Giaier ...................... B60Q 1/08 |
| 2004/0226755 | A1 | * | 11/2004 | Pottebaum ............. G01G 19/12 177/25.13 |
| 2005/0012501 | A1 | | 1/2005 | Isono et al. |

(Continued)

OTHER PUBLICATIONS

U.S. Appl. No. 15/881,220, filed Jan. 26, 2018, Scott.

(Continued)

*Primary Examiner* — Lisa M Caputo
*Assistant Examiner* — Nigel H Plumb
(74) *Attorney, Agent, or Firm* — Craig R. Miles; CR Miles P.C.

(57) ABSTRACT

A load sensor having a centrally disposed aperture element through which a fastening element of a vehicle air suspension assembly passes to affix the load sensor between the vehicle air suspension assembly and the vehicle suspension, wherein the load sensor has a force measurement sensor disposed proximate an elongate slot to generate a load signal which varies based on an amount of strain in the load sensor, wherein the load signal received by a load calculator allows calculation of the load exerted from the vehicle frame to the vehicle suspension.

8 Claims, 15 Drawing Sheets

(56) References Cited

U.S. PATENT DOCUMENTS

2005/0269753 A1 12/2005 Geiger et al.
2018/0211219 A1 7/2018 Scott

OTHER PUBLICATIONS

U.S. Appl. No. 62/450,994, filed Jan. 26, 2017, Scott.
Blue Ink Tech. BIT—Blue Ink Tech: BIT Air Scale. Website, https://blueinktech.com, originally downloaded May 22, 2019, 5 pages.
Dat. Freight Marketplace. Website, https://www.dat.com, originally downloaded Feb. 7, 2018, 8 pages.
FR8STAR. Specialized Freight Marketplace—Freight Shippers. Website, https://fr8star.com, originally downloaded Feb. 7, 2018, 10 pages.
Load Xpert. Axle Load Calculation and Load Planning Software. Website, http://www.loadxpert.com, originally downloaded Feb. 7, 2018, 1 page.
Truckers Brotherhood Ltd. Website, https://truckersbrotherhood.com, originally downloaded Feb. 7, 2018, 5 pages.
truckstop.com. Load Board and Freight Management. Website, https://truckstop.com, originally downloaded Feb. 7, 2018, 9 pages.
Veritread. The Heavy-Haul Marketplace. Website, https://www.veritread.com, originally downloaded Feb. 7, 2018, 2 pages.
U.S. Appl. No. 16/410,861, Office Action dated Feb. 25, 2022.
PCT International Patent Application No. PCT/US20/32214, International Search Report and Written Opinion of the International Searching Authority dated Oct. 1, 2020, 23 pages.

* cited by examiner

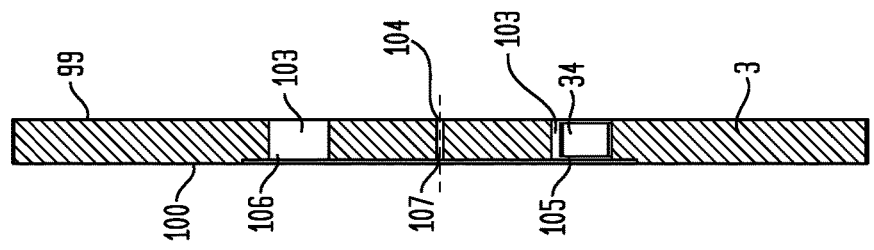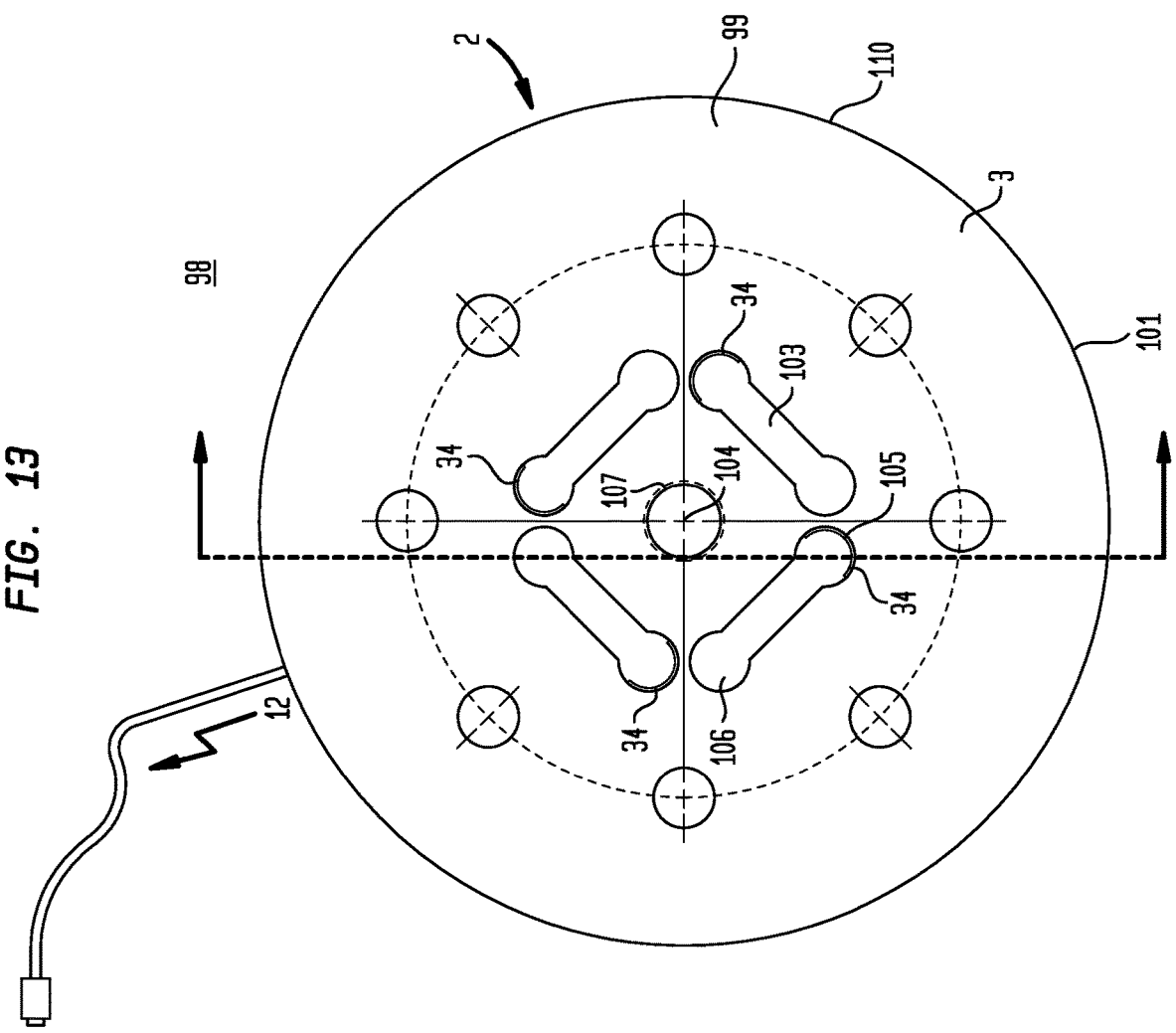

$F_t$ = FORCE ACTING ON TIRE (81)
$F_p$ = FORCE ACTING ON PIVOT (p)
$F_a$ = FORCE ACTING ON AIR SUSPENSION CENTER (ASC)

$D_1$ = DISTANCE ($D_1$) FROM PIVOT CENTER (D) TO AXLE CENTER (AC)
$D_2$ = DISTANCE ($D_2$) FROM AIR SUSPENSION (ASC) CENTER TO AXLE

LOAD SENSOR SYSTEM WITH IMPROVED ASSEMBLY CONNECTION

FIELD OF THE INVENTION

A load sensor system including one or more load sensors disposed between a vehicle frame and a vehicle suspension of a vehicle, each load sensor communicatively coupled to a computer including a load sensor program executable to correspondingly process one or more load signals generated by the one or more load sensors to calculate the load disposed on the frame of the vehicle.

SUMMARY OF THE INVENTION

Accordingly, a broad object of particular embodiments of the invention can be to provide a load sensor including a load sensor body including a load sensor body first end configured to couple to a vehicle frame and a load sensor body second end configured to couple to a vehicle suspension, the load sensor body having a load sensor which generates a load signal which varies based on the deformation of the load sensor body in response to an amount of force transferred from the vehicle frame to the vehicle suspension.

Another broad object of the invention can be to provide a method of making a load sensor including one or more of: coupling a load sensor to a load sensor body including a load sensor body first end configured to couple to a vehicle frame (whether directly or indirectly via an air suspension assembly or torsion member suspension assembly) and a load sensor body second end configured to couple to a vehicle suspension, the load sensor adapted to generate a load signal which varies based on the deformation of the load sensor body in response to an amount of force transferred from a vehicle frame to a vehicle suspension, and a computer including a processor communicatively coupled to a non-transitory computer readable medium containing a load sensor program executable to correspondingly process one or more load signals generated by the one or more load sensors to calculate the load disposed on the frame of the vehicle.

Another broad object of the present invention can be to provide a load sensor kit to retrofit a conventional vehicle suspension with one or more load sensors each including a load sensor body having a first face opposite a second face, the first face configured to affix to a vehicle air suspension assembly and the second face configured to affix to a vehicle suspension, the load sensor body including a load sensor which generates a load signal which varies based on the deformation of the load sensor body in response to an amount of force transferred from a vehicle frame to a vehicle suspension, and a load sensor program contained on a computer readable medium executable by a processor of a computer to correspondingly process one or more load signals generated by the one or more load sensors to calculate the load disposed on the frame of the vehicle.

Another broad object of the invention can be to provide a method of using a load sensor system including one or more of: disposing a load on a vehicle, sensing the load disposed on the vehicle by operation of one or more load sensors coupled between the vehicle frame and the vehicle suspension, generating a load signal from each of the load sensors, and processing the load signal received from each of the load sensors by operation of a load sensor computer communicatively coupled to the load sensor, calculating the load sensed by each load sensor by operation of a load sensor program contained in a non-transitory computer readable medium of the load sensor computer; transmitting calculated load associated with each load sensor to a client computer; processing the calculated load associated with each load sensor by operation of the load sensor program contained in the client computer non-transitory computer readable memory containing the load sensor program; and calculating the total load disposed on the vehicle frame.

Naturally, further objects of the invention are disclosed throughout other areas of the specification, drawings, photographs, and claims.

BRIEF DESCRIPTION OF THE DRAWINGS

FIG. 13 is a bottom plan view of a particular embodiment of a load sensor.

FIG. 14 is a cross sectional view 14-14 of a particular embodiment of a load sensor shown in FIG. 13.

DETAILED DESCRIPTION OF THE INVENTION

Figure 1:
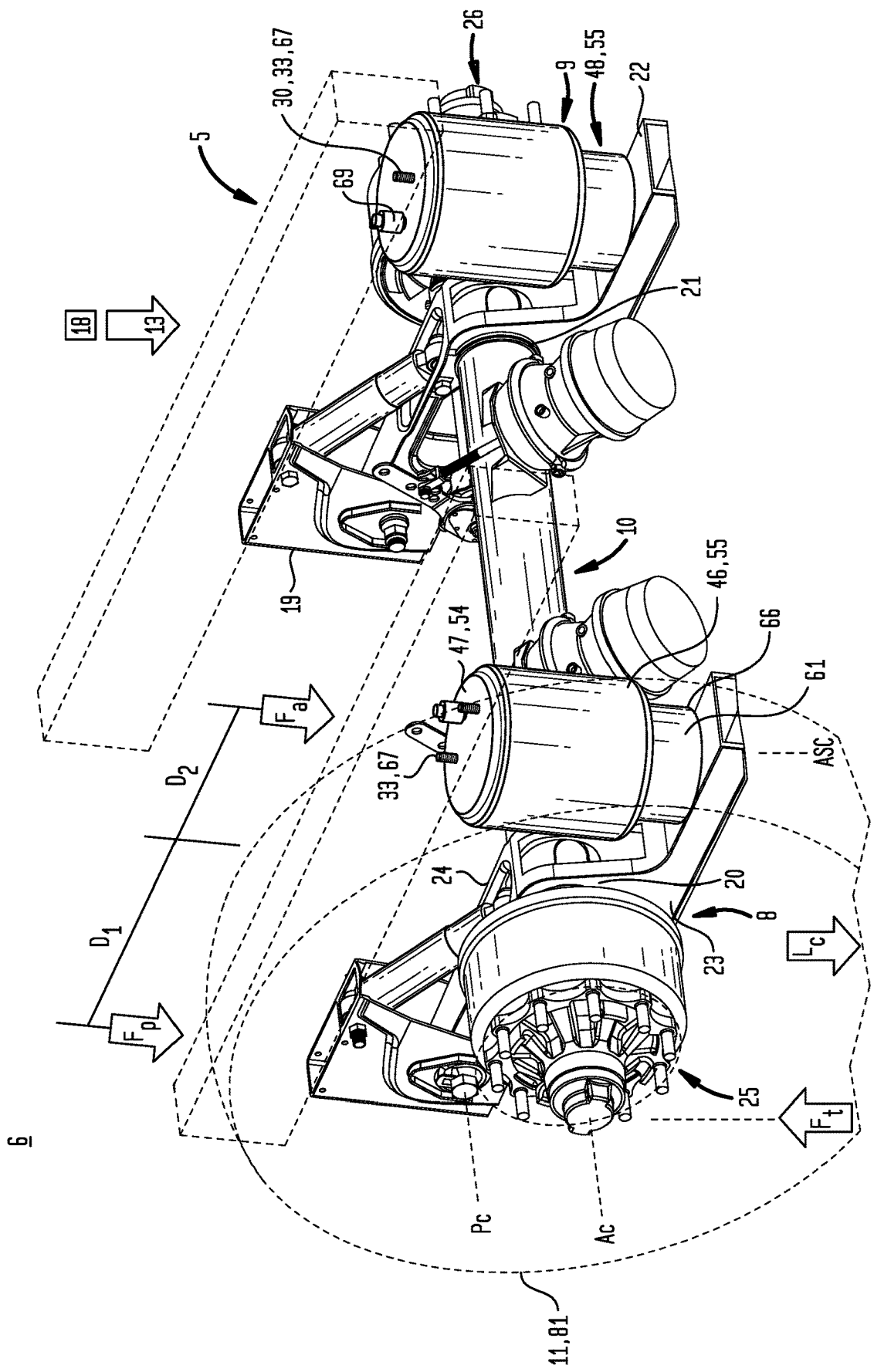
FIG. 1 is a perspective view of a particular embodiment of an air suspension assembly coupled between a vehicle frame and a vehicle suspension.

Generally, referring to FIGS. 1 through 24, which illustrate particular embodiments of a load sensor system (1) which can include one or more load sensors (2) each including a load sensor body (3) including a load sensor body first end (4) configured to couple to a vehicle frame (5) of a vehicle (6) and a load sensor body second end (7) configured to couple to a vehicle suspension (8) of the vehicle (6). In particular embodiments, the load sensor body first end (4) can be coupled to an air suspension assembly (9) configured to couple to the vehicle frame (5), and the load sensor body second end (7) can be configured to couple to the vehicle suspension (8).

For purposes of this invention, the term "vehicle" means any form of a conveyance or transport including at least one axle (10) and without sacrificing the breadth of the foregoing, illustrative examples of vehicles (6) include semi-tractors, semi-tractor trailers, carriages, cars, trucks, tractors, and trailers.

For the purposes of this invention, the term "vehicle frame" means the main supporting structure, or chassis of a vehicle.

For the purposes of this invention the term "vehicle suspension" means the assembly linkages that connect the vehicle frame (5) to the vehicle wheels (11); and while the Figures show one particular vehicle suspension as it relates to a single axle (10), it is to be understood that a vehicle (6) can include a plurality of vehicle suspensions (8) correspondingly attached to a plurality of axles (10).

Again, generally referring to FIGS. 1 through 24, embodiments of the load sensor (2) can operate to generate a load sensor signal (12) which varies based on an amount of force (13) transferred from the vehicle frame (5) to the vehicle suspension (8). A load sensor computer (14) can be communicatively coupled to each of the one or more load sensors (2) to receive the load signal (12). The load sensor computer (14) can include a load sensor computer processor (15) communicatively coupled to a load sensor non-transitory computer readable memory (16) containing a load sensor program (17) executable to receive the load signal (12) from the one or more load sensors (2) and calculate the load (18) exerted by the vehicle frame (5) to the vehicle suspension (8).

The term "load" for the purposes of this invention means the force (13) exerted from the vehicle frame (5) to the vehicle suspension (8) in Newtons or converted to any coherent system of units (such as the International System of Units).

Now, generally referring to FIGS. 1 and 2, and 9 and 10, a particular embodiment of the vehicle suspension (8) includes, in opposed pairs: a suspension hanger (19), a suspension main body (20) having an axle aperture element (21), and a suspension beam (22). Each suspension hanger (19) can be coupled to the vehicle frame (5) (shown in broken line in the example of FIG. 1). Each suspension main body (20) pivotally couples having pivot center (PC) to one suspension hanger (19) and includes an axle aperture element (21) communicating between a suspension main body first side (23) and a suspension main body second side (24).

Each suspension beam (22) outwardly extends from a suspension main body (20). An axle (10) having axle center (AC) can be disposed in the axle aperture elements (21) of the pair of suspension main bodies (20). A first of the opposed pairs of the vehicle suspension (8) can be disposed proximate the axle first end (25), and a second of the opposed pairs of vehicle suspension (8) can be disposed proximate an axle second end (26). An air suspension assembly (9) can be coupled between each of the suspension beams (22) and the vehicle frame (5).

Figure 2:
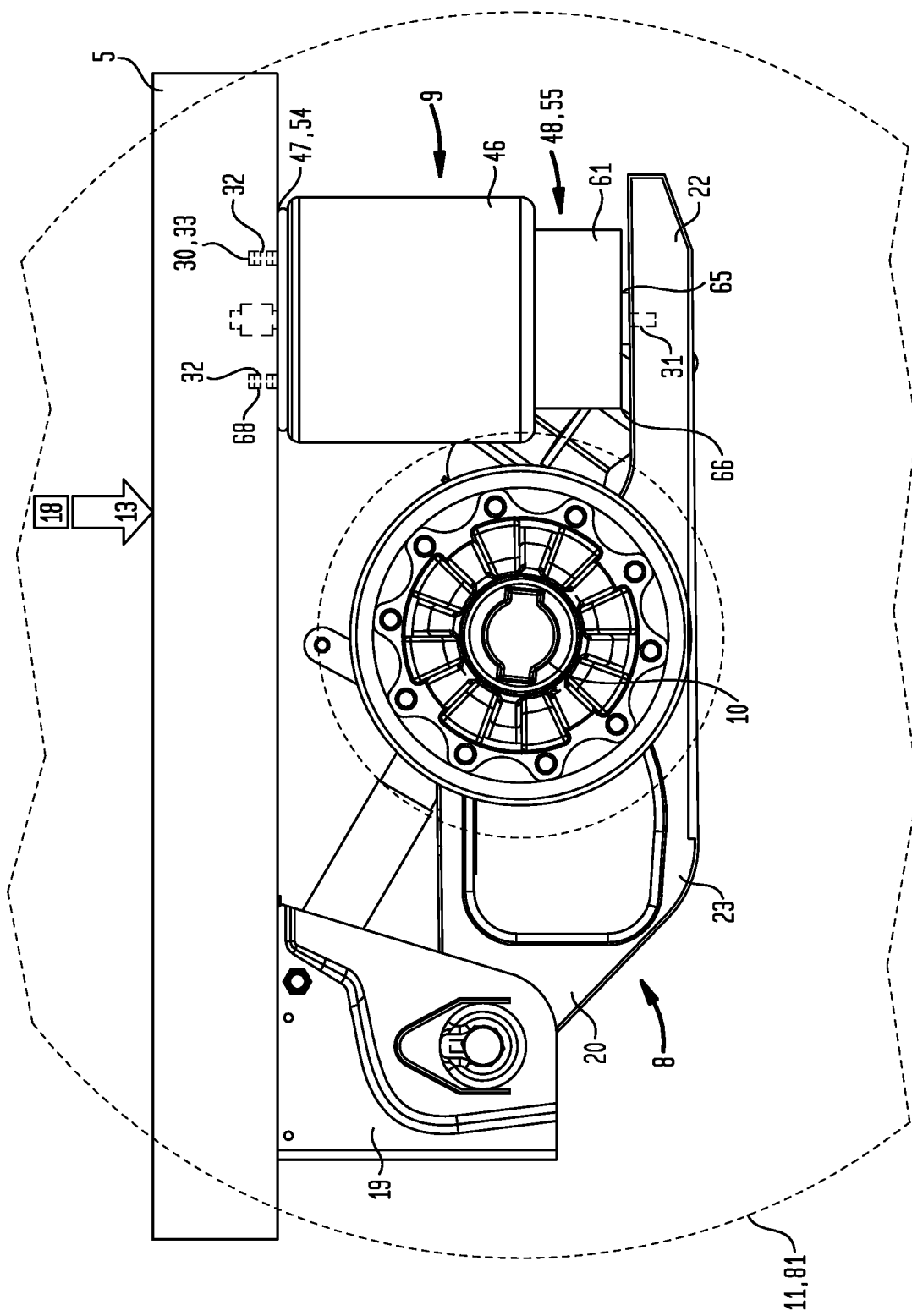
FIG. 2 is a side elevation view of a particular embodiment of an air suspension assembly coupled between a vehicle frame and a vehicle suspension.
Figure 3:
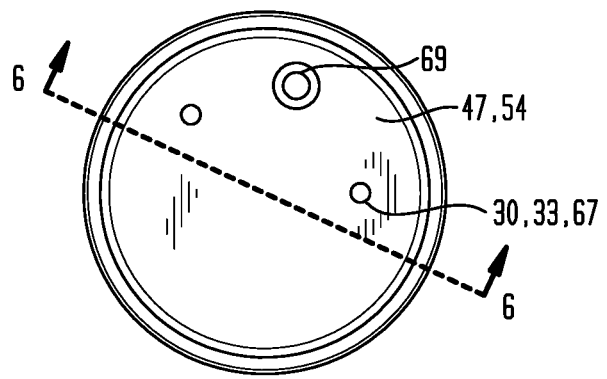
FIG. 3 is a top plan view of a particular embodiment of an air suspension assembly.
Figure 4:
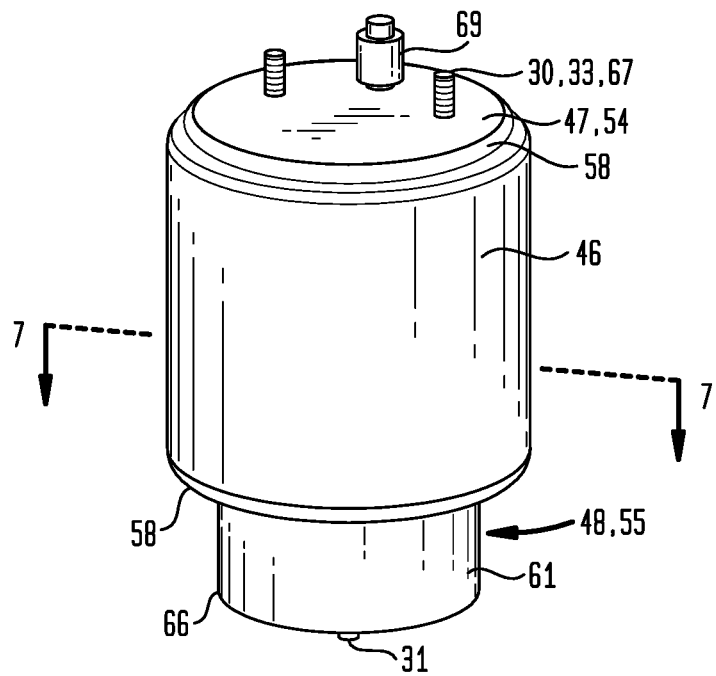
FIG. 4 is a perspective view of a particular embodiment of an air suspension assembly.
Figure 5:
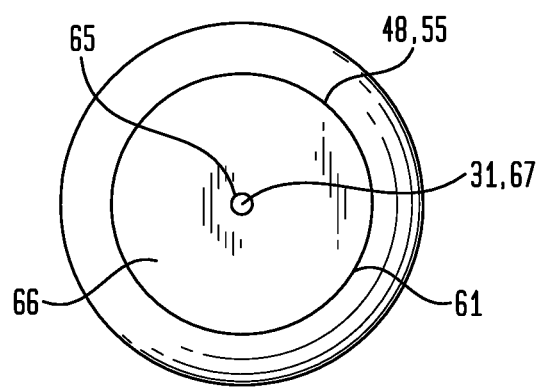
FIG. 5 is a bottom plan view of a particular embodiment of an air suspension assembly.

Now, referring primarily to FIGS. 1 through 8, there is illustrated a particular embodiment of a load sensor (2) adapted to the particular embodiment of the vehicle suspension shown in FIGS. 1 and 2, the load sensor (2) including a load sensor body first end (4) configured to couple to a vehicle frame (5) and a load sensor body second end (7) configured to couple to a vehicle suspension (8) of a vehicle (6). However; other embodiments are expressly contemplated.

Figure 6:
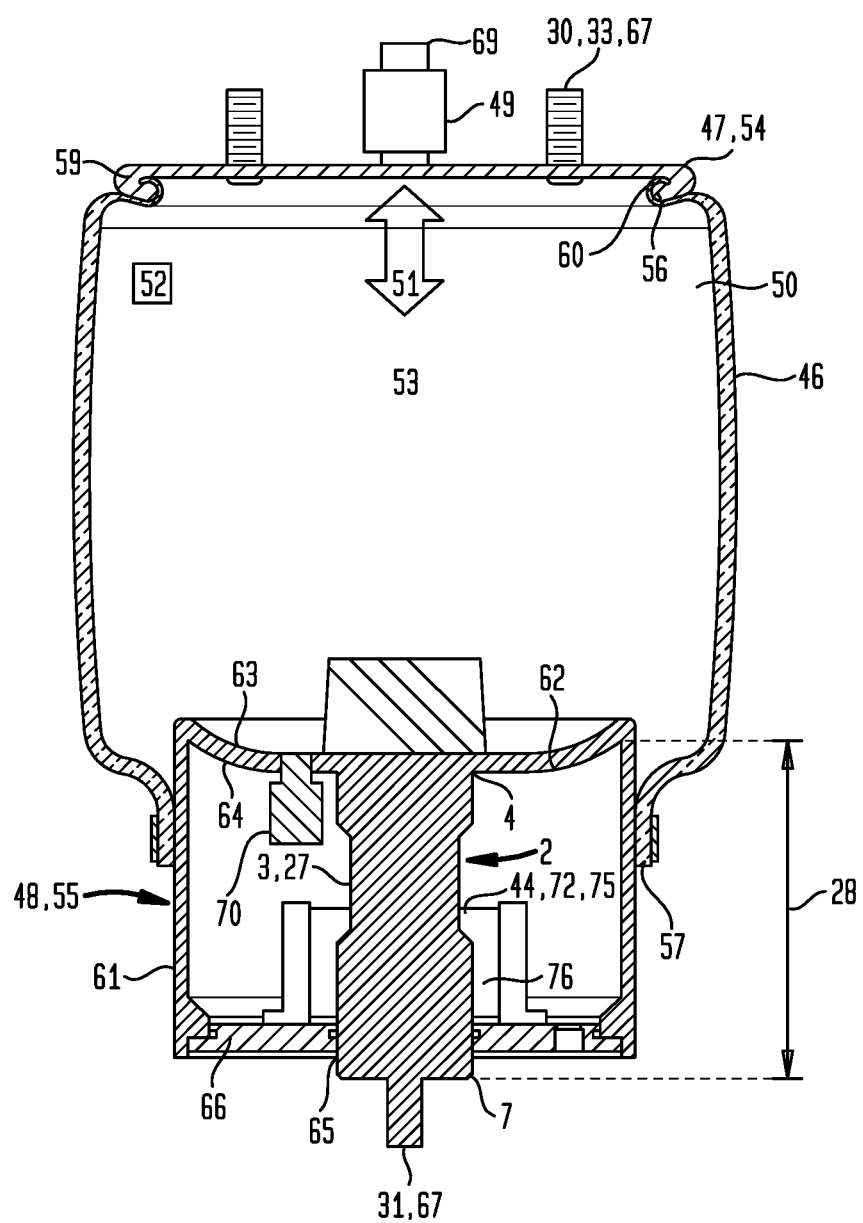
FIG. 6 is a cross sectional view 6-6 of FIG. 3 of a particular embodiment of an air suspension assembly.
Figure 7:
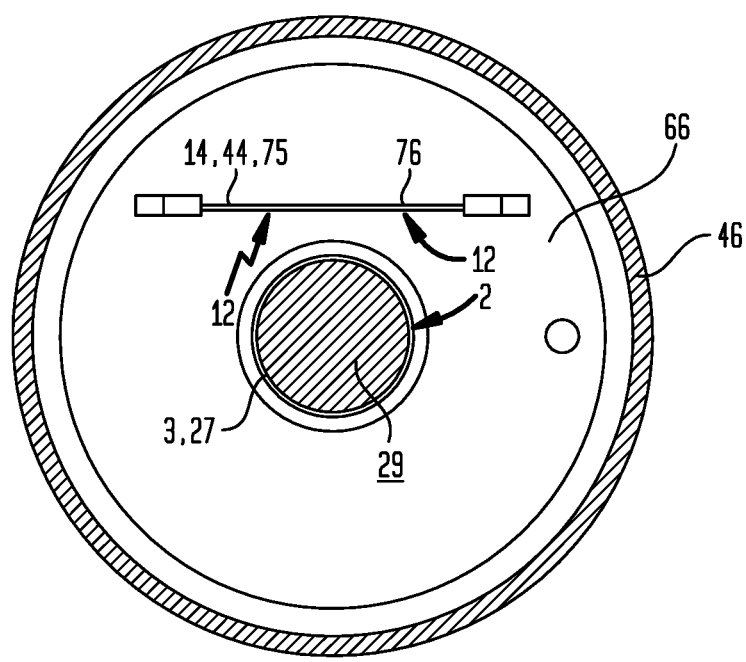
FIG. 7 is a cross sectional view 7-7 of FIG. 4 of a particular embodiment of an air suspension assembly.
Figure 8A:
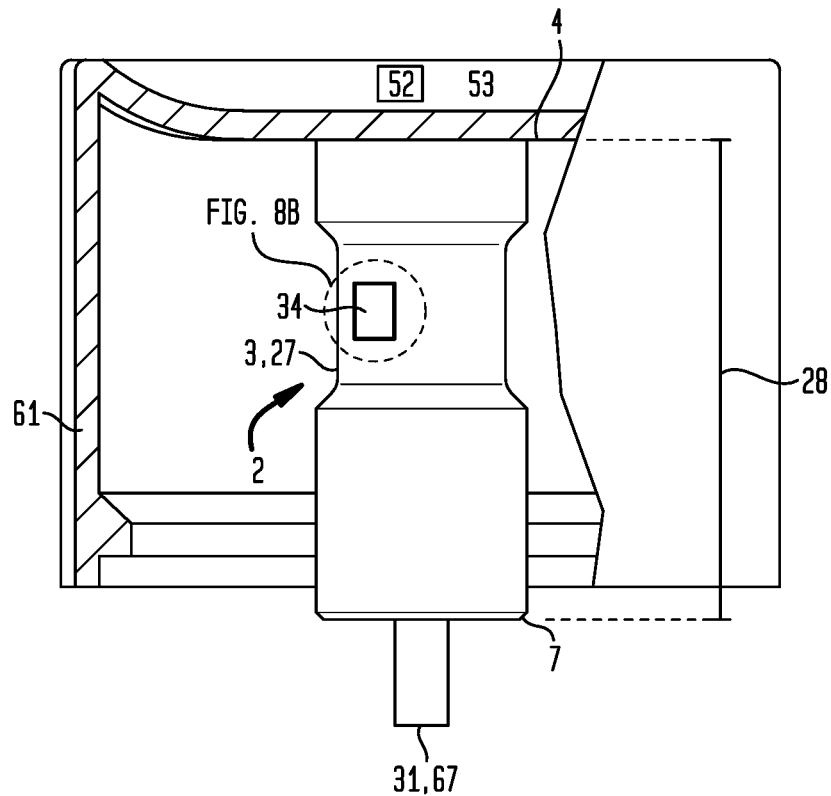
FIG. 8A is a side elevation view of a particular embodiment of a load sensor.
Figure 8B:
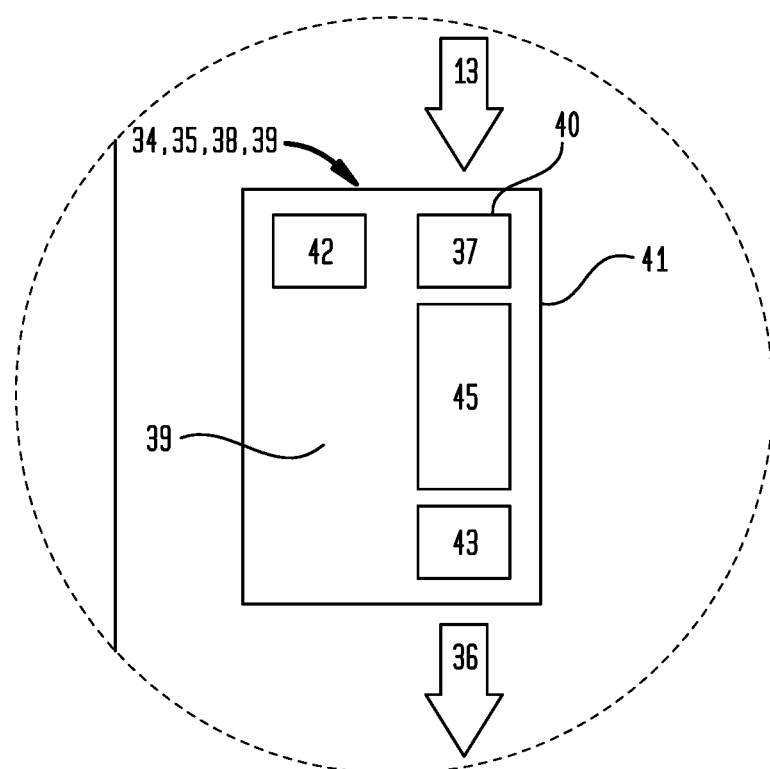
FIG. 8B is an enlarged view of a particular embodiment of a strain sensor.

With reference to FIGS. 6 through 8, in particular embodiments, the load sensor body (3) can be configured as a generally cylindrical member (27) having a load sensor body length (28) disposed between a load sensor body first end (4) opposite a load sensor body second end (7) each defining a generally circular load body end surface (29). The load sensor body first end (4) can be configured to couple to a vehicle frame (5) and the load sensor body second end (7) can be configured to couple to the vehicle suspension (8), thereby transferring the load (18) exerted by the vehicle frame (5) to the load sensor body first end (4) through the load sensor body (3) to the load sensor body second end (7) coupled to the vehicle suspension (8). In particular embodiments, a first fastener element (30) coupled to the load sensor body first end (4) can be configured to fasten the load sensor body first end (4) to the vehicle frame (5), and a second fastener element (31) coupled to the load sensor body second end (7) can be configured to fasten the load sensor body second end (7) to a vehicle suspension (8).

In the particular example of FIGS. 1 through 8, a first fastener element (30) can extend from the load sensor body first end (4) to the vehicle frame (5) and the second fastener element (31) can extend from the load sensor body second end (7) to the vehicle suspension (8). However, this illustrative example of first and second fastener elements (30) (31) is not intended to preclude other configurations of fasteners useful in coupling the load sensor (2) to the vehicle frame (5) or the vehicle suspension (8), such as, threaded bores (32) in the load sensor body first or second ends (4) (7) which rotationally receive mated threaded members (33).

Now, referring primarily to FIG. 6, a strain sensor (34) may be disposed on the load sensor body (3). The strain sensor (34) can be responsive to elastic deformation of the load sensor body (3) due to force (13) from a load (18) transferred from the vehicle frame (5) to the load sensor body first end (4) to generate a load signal (12) which correspondingly varies based upon the amount of deformation of the load sensor body (3). Examples of strain sensors (34) which can be disposed on the load sensor body (3) include strain gauges and piezoelectric sensors; although other mechanical, hydraulic, electrical or optical sensors which respond to deformation of the load sensor body (3) can be used (referred to herein individually and collectively as "strain sensors").

By way of a first example, the strain sensor (34) can, but need not necessarily, be a transducer with a bridge circuit. The strain sensor (34) can be responsive to elastic deformation of the load sensor body (3) which can be first converted to a change in resistance, so that a bridge circuit electrical output (35) can be generated and converted to a proportional output voltage (36) with the aid of an amplifier (37).

By way of a second example, the strain sensor (34) can be a piezoelectric sensor (38). The piezoelectric sensor (38) can include a piezoelectric crystal (39) (or piezo ceramic) with two parallel faces (40) (41). The first parallel face (40) can be engaged to the load sensor body (3). Each of the two parallel faces (40) (41) can have electrodes (42) affixed thereto. The electrodes (42) can be further attached to contacts (43) which are communicatively coupled to an external circuit (44) which can measure the change in voltage (36) of the piezoelectric crystal (39). As the load sensor body (3) deforms under the force (13) of a load (18) transferred from the vehicle frame (5) to the vehicle suspension (8), the piezoelectric crystal (39) can correspondingly deform. The deformation of the piezoelectric crystal (39) generates a small voltage (36) between the two parallel faces (40) (41). The voltage (36) generated by the deformation of the piezoelectric crystal (39) is directly proportional to the strain (45) generated in the load sensor body (3) by the force (13) of a load (18) transferred from the vehicle frame (5) to the vehicle suspension (8). Thus, the change in voltage (36) directly corresponds to the change in strain (45) of the piezoelectric crystal (39) which directly corresponds to the load (18) on the load sensor body (3).

Again, referring primarily to FIGS. 1 through 8, particular embodiments of a load sensor system (1) can include an air suspension assembly (9) having an air suspension center (ASC). The air suspension assembly (9) can be disposed between the vehicle frame (5) and the suspension beam (22) of the vehicle suspension (8). Embodiments of the air suspension assembly (9) can include a tubular elastomeric member (46) sealably coupled between a first end mount (47) configured to affix to the vehicle frame (5) and a second end mount (48) coupled or engaged to the load sensor body first end (4) and having the load sensor body second end (7) configured to affix to the vehicle suspension (8). A compressor (49) can be fluidicly coupled to the tubular elastomeric member interior space (50) defined by the tubular elastomeric member (46) sealably coupled to the first and second end mounts (47) (48).

Now, referring primarily to FIGS. 3 through 8, embodiments of the tubular elastomeric member (46) sealably joined to the first end mount (47) and the second end mount (48) can provide a substantially air-tight construction which can receive a fluid flow (51) by operation of the compressor (49) to maintain a pre-selected fluid pressure (52) within the interior space (50). The tubular elastomeric member interior space (50) can be fillable with a fluid (53). The fluid (53) can comprise or be selected from the group consisting of: a mixture of gases, air, a purified gas, nitrogen, argon, or combinations thereof.

In particular embodiments, the first and second end mounts (47) (48) can be configured as closed end cylinders (54) (55) and the tubular elastomeric member first and second ends (56) (57) can sealably engage the respective cylindrical sidewalls (58) of the closed end cylinders (54) (55), similar to the construction of a Firestone Airide Air Spring W02-358-7017.

With primary reference to FIG. 6, embodiments can, but need not necessarily, include a first end mount (47) having a mount peripheral margin (59) mated with the tubular elastomeric member first end margin (60) and rolled to crimp the tubular elastomeric member first end margin (60) between the opposed surfaces of the rolled mount peripheral margin (59). The second end mount (48) can be configured as a tubular housing (61) with a first closed end (62) having a first face (63) inwardly facing the tubular elastomeric member interior space (50) and having a second face (64) outwardly facing from the interior space (50) and engaged to the load sensor body first end (4). The load sensor body (3) extends outward from the second face (64) of the first closed end (62) and passes through a housing aperture (65) in the second closed end (66) of the tubular housing (61) to dispose the load sensor body second end (7) external to the tubular housing (61). The tubular elastomeric member second end (57) can be circumferentially affixed to the tubular housing (61).

Again, referring primarily to FIGS. 1 through 8, the first end mount (47) can include one or more fastener elements (67) configured to allow the first end mount (47) to affix to the vehicle frame (5). While the particular embodiments shown in the Figures show outwardly extending threaded members (33) which engage mateably threaded annular members (68), this illustrative example is not intended to preclude embodiments which employ other configurations of fastener elements (67), such as threaded bores (32) which engage mateably threaded members (33), interlocking plates, or the like.

Similarly, the load sensor body second end (7) can include one or more fastener elements (67) configured to allow the load sensor body second end (7) to affix to the vehicle suspension (8) (or suspension beam (22) as shown in the example of FIGS. 1 and 2). Again, while the particular embodiments shown in the Figures show an outwardly extending threaded member (33) which engages a mateably threaded annular member (68), this illustrative example is not intended to preclude embodiments which employ other configurations of fastener elements (67), such as a threaded bore (32) disposed in the load sensor body second end (7) which mateably engage thread members (33), or the like.

Now, referring primarily to FIGS. 1 through 6, particular embodiments of the air suspension assembly (9) can further include a valve (69). The valve (69) can be coupled to the first end mount (47) or the second end mount (48). The valve (69) can be operable to allow passage of the fluid (53) into or away from the tubular elastomeric member interior space (50).

Again, referring primarily to FIGS. 1 through 6, particular embodiments of the air suspension assembly (9) can further include a fluid pressure sensor (70). The fluid pressure sensor (70) can be coupled to the first end mount (47) or the second end mount (48). The fluid pressure sensor (70) can generate a fluid pressure signal (71) which varies based upon the fluid pressure (52) inside of the elastomeric member interior space (50).

In particular embodiments, a load sensor computer (14) can, but need not necessarily, be disposed in the tubular housing (61) of the second end mount (48) of the load sensor (2). The load sensor computer (14) can include a load sensor computer processor (15) in communication with a load sensor computer non-transitory computer readable medium (16) containing the load sensor program (17). The load sensor computer (14) can be in the form of a microprocessor (75) disposed on a printed circuit board (76) disposed inside of the tubular housing (61) as shown in the example of FIG. 7; although this illustrative example is not intended to preclude embodiments in which the load sensor computer (14) comprises other forms of a processor (15) and non-transitory computer readable medium (16) or has a location outside of the tubular housing (61).

The load sensor computer (14) can be communicatively coupled to the strain sensor (34) disposed on the load sensor body (3). The load sensor program (17) can include a load calculator (77) which can be executed to receive the load sensor signal (12) generated by the load sensor (2) and compare one or more characteristics of the load sensor signal (12) (such as signal amplitude) against a plurality of standardized load force values (78) held in a load force table (79) and correlate the load sensor signal (12) to one or more load force values (78) which can be used to calculate the total force (80) in Newtons acting on the vehicle tire (81) (shown in broken line in the examples of FIGS. 1 and 2) correspondingly associated with the load sensor (2) generating the load sensor signal (12).

In particular embodiments the load sensor computer (14) can, but need not necessarily, include a fluid pressure sensor module (82) executable to receive the fluid pressure signal (71) from the fluid pressure sensor (70). The fluid pressure sensor module (82) can be further executed to compare one or more characteristics of the pressure sensor signal (71) (such as signal amplitude) against a plurality of standardized load force values (78) held in the load force table (79) and correlate the fluid pressure signal (12) with one or more load force values (78) which can be used to calculate the total force (80) in Newtons acting on the vehicle tire (81) (shown in broken line in the examples of FIGS. 1 and 2) correspondingly associated with the pressure sensor (70) generating the pressure sensor signal (71). In particular embodiments, the load calculator can use the load force values (78) derived by correlation of the load sensor signal (12) with a standardized load force value (78), or by correlation of the fluid pressure signal (71) with a standardized load force value (78), independent of the other, or in factored combination, to derive the total force (80) acting on the vehicle tire(s) (81) which can be converted to any coherent system of units (such as the International System of Units).

Figure 23:
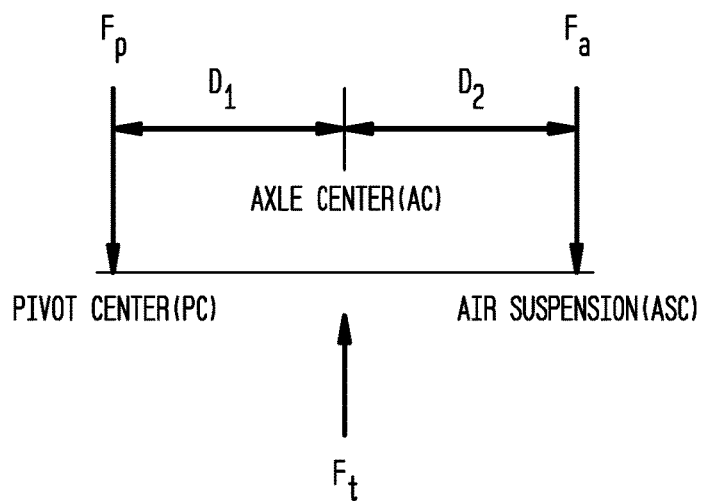
FIG. 23 is an illustration of the forces on a particular embodiment of an axle.

In particular embodiments, the load sensor computer (14) can, but need not necessarily, include a data exchanger (83) operable to transmit the calculated total force (80) acting on the corresponding tire (81) to a central computer (84) which can, but need not necessarily, be communicatively coupled through a network (85) to one or more server computers (86) (as shown in the example of FIG. 23). In particular embodiments, the data exchanger (83) can include a radio frequency controller (87) which operates a radio frequency transmitter (88) to cause wireless connection or pairing of the load sensor computer (14) with the client computer (84) over a short-range radio frequency band (89) to carry a signal over all or a part of the communication path between each load sensor computer (14) and the client computer (84). The short-range radio frequency band (89) can include, as illustrative examples: BLUETOOTH® (90) which operates at frequencies of about 2402 MHz to about 2480 MHz or about 2400 MHz to about 243.5 MHz or WI-FI® (91) which operates at about 2.4 GHz or 5 GHz.

Now referring generally to FIGS. 1 through 8 and 24, the load sensor system (1) can include a plurality of load sensors (2) each disposed to sense a load (18) transferred from the vehicle frame (5) to the vehicle suspension (8). In particular embodiments, the load sensor system (1) can include a plurality of air suspension assemblies (9), each or a portion of the plurality of air suspension assemblies (9) can include a load sensor (2) which can be communicatively coupled to a load sensor computer (14) or directly to a client computer (84).

Figure 24:
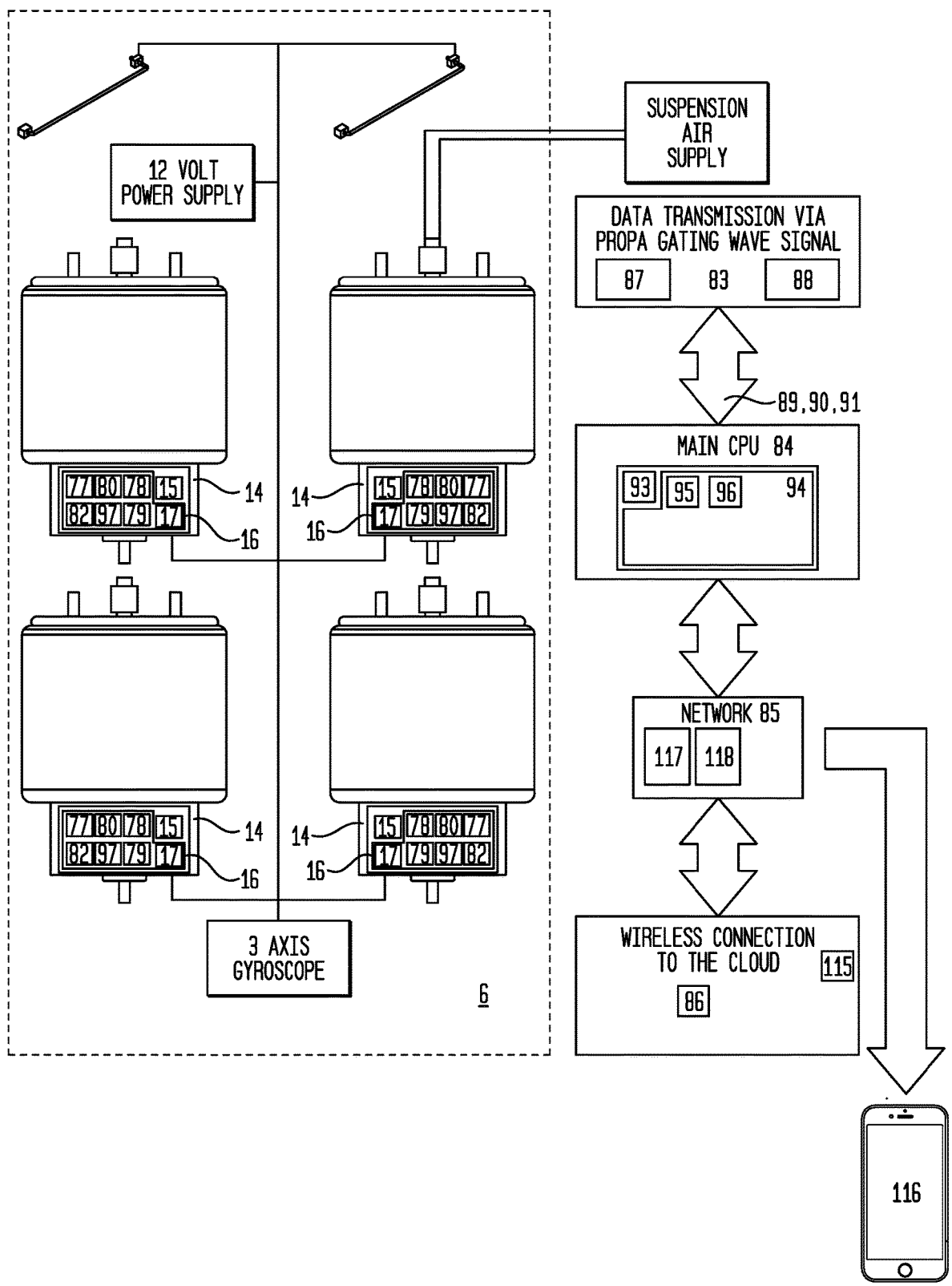
FIG. 24 is a block flow diagram of a load sensor system.

Now referring primarily to FIG. 24, the central computer (84) can include a central computer processor (93) communicatively coupled to a central computer non-transitory computer readable medium (94) containing a central computer program (95). The central computer program (95) can include a central computer data exchanger (96) which pairs with each of the one or more load sensor computers (14) over the short-range radio frequency band (89) to receive the load sensor signal (12) directly or receive the force (13) or load data (97) calculated by the one or more load sensor computer(s) (14). The central computer program (95) can be further executed to calculate the total load (18) transmitted from the vehicle frame (5) to the plurality of tires (81) on the vehicle (6).

Now referring to FIGS. 1, 23, and 24, in particular embodiments, the load data received from each of the load sensor bodies can be used to determine the total force acting on the vehicle. The force acting on the tire (81) equals the force acting on the pivot center (PC) and the force acting on the air suspension center (ASC) ($F_t = F_p + F_a$). The system can be considered to be at static equilibrium, therefore the moments are equal with regards to the moments corresponding to each force disposed on opposite sides of the axle. Moment is defined as force times distance, so $F_p * D_1 = F_a * D_2$ in this exemplary calculation. The foregoing equation can be solved for $F_p$, because $F_a$ is measured as indicated herein with the strain sensor (34) disposed on the load sensor body (3), and the distances are known. The total load on the tire (81) ($F_t$) can then be calculated. To calculate the total load (13) placed on the vehicle (6), each $F_t$ corresponding to a plurality of tires (81) can be summed. In further particular embodiments, the percentage of weight of the load on each tire can further be used to determine the load center of gravity ($L_c$). The load center of gravity ($L_c$) can be used to properly place a load (18) on the vehicle (6).

Figure 9:
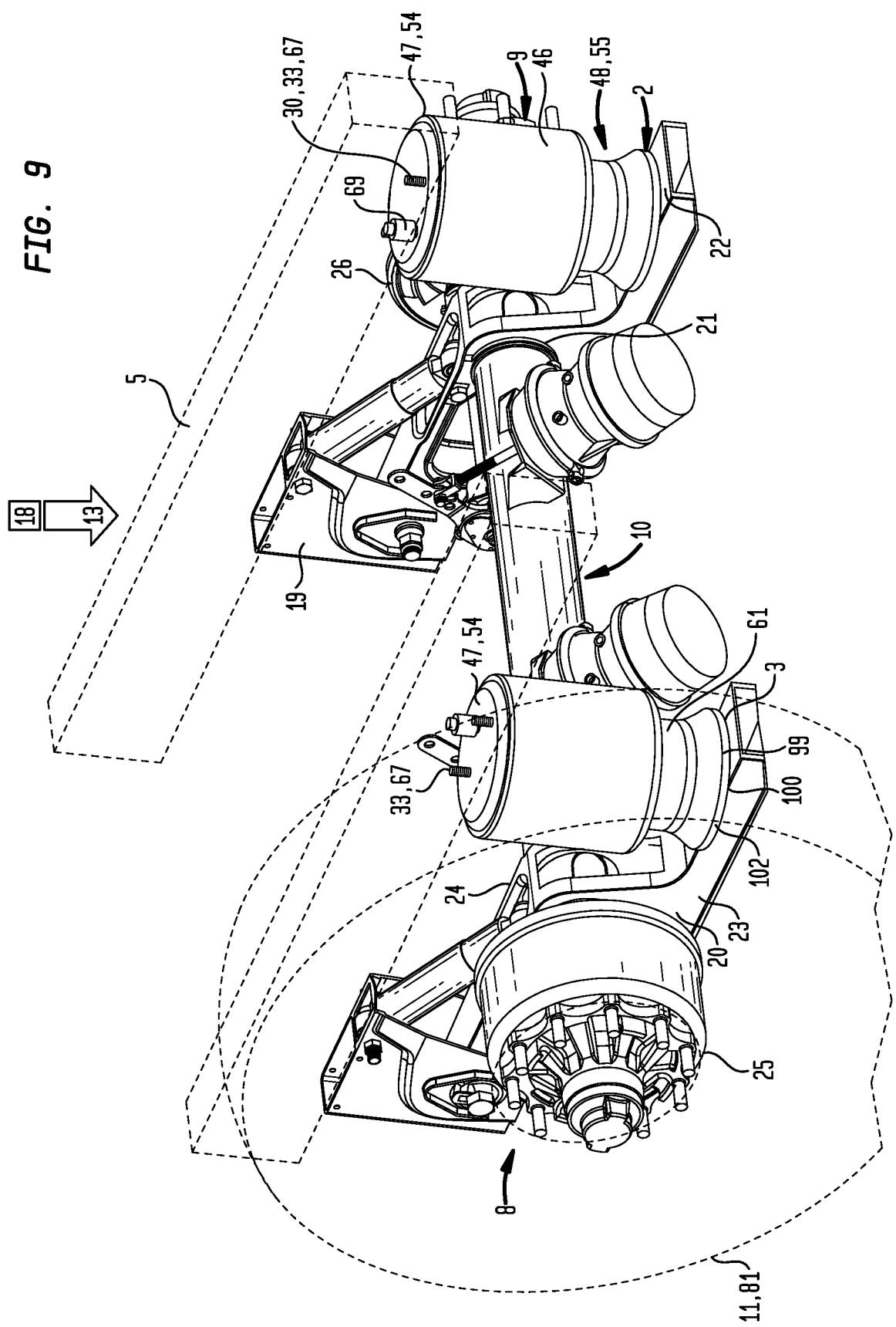
FIG. 9 is a perspective view of a particular embodiment of an air suspension assembly coupled to a particular embodiment of a load sensor.
Figure 10:
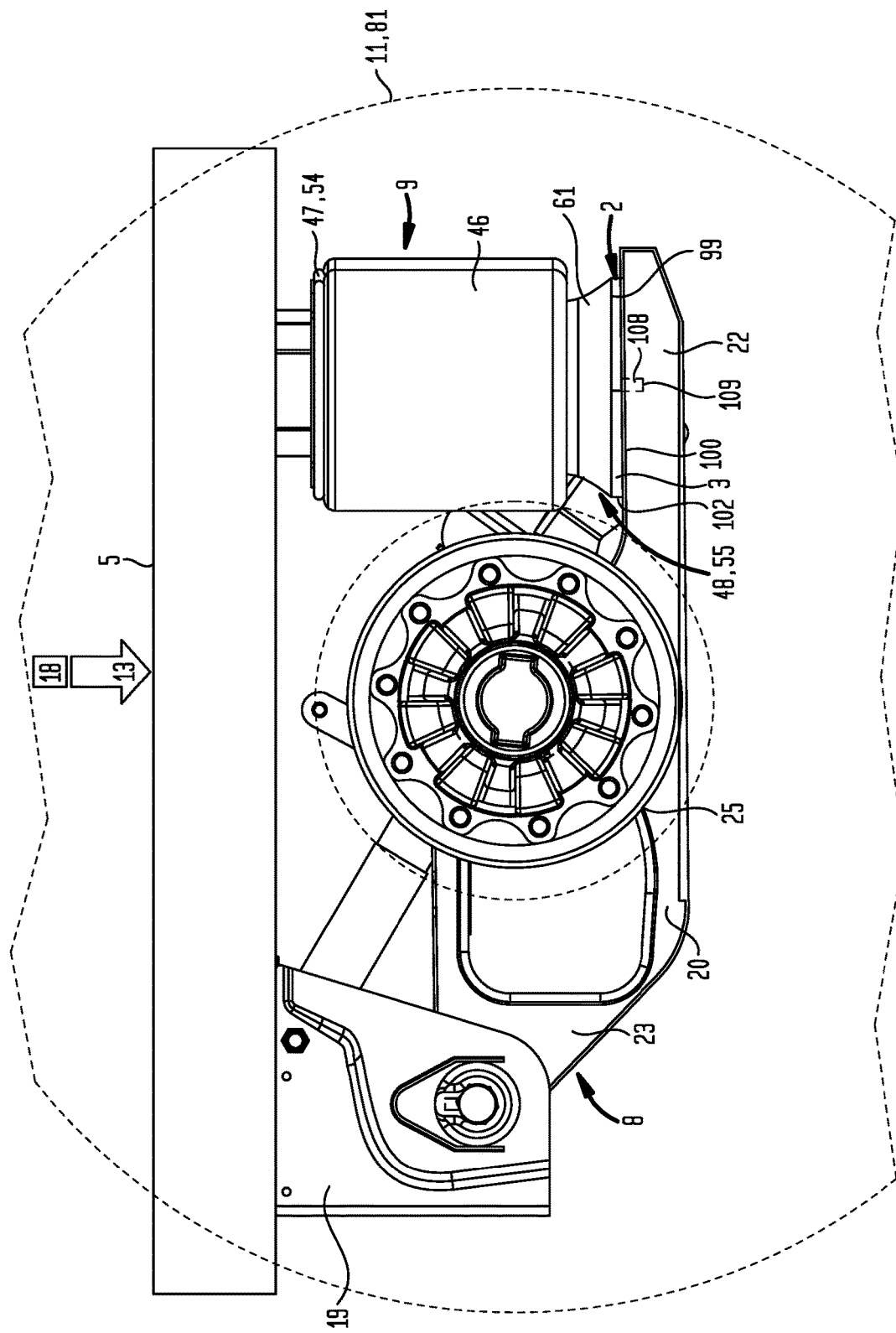
FIG. 10 is a side elevation view of a particular embodiment of an air suspension assembly coupled to a particular embodiment of a load sensor.
Figure 11:
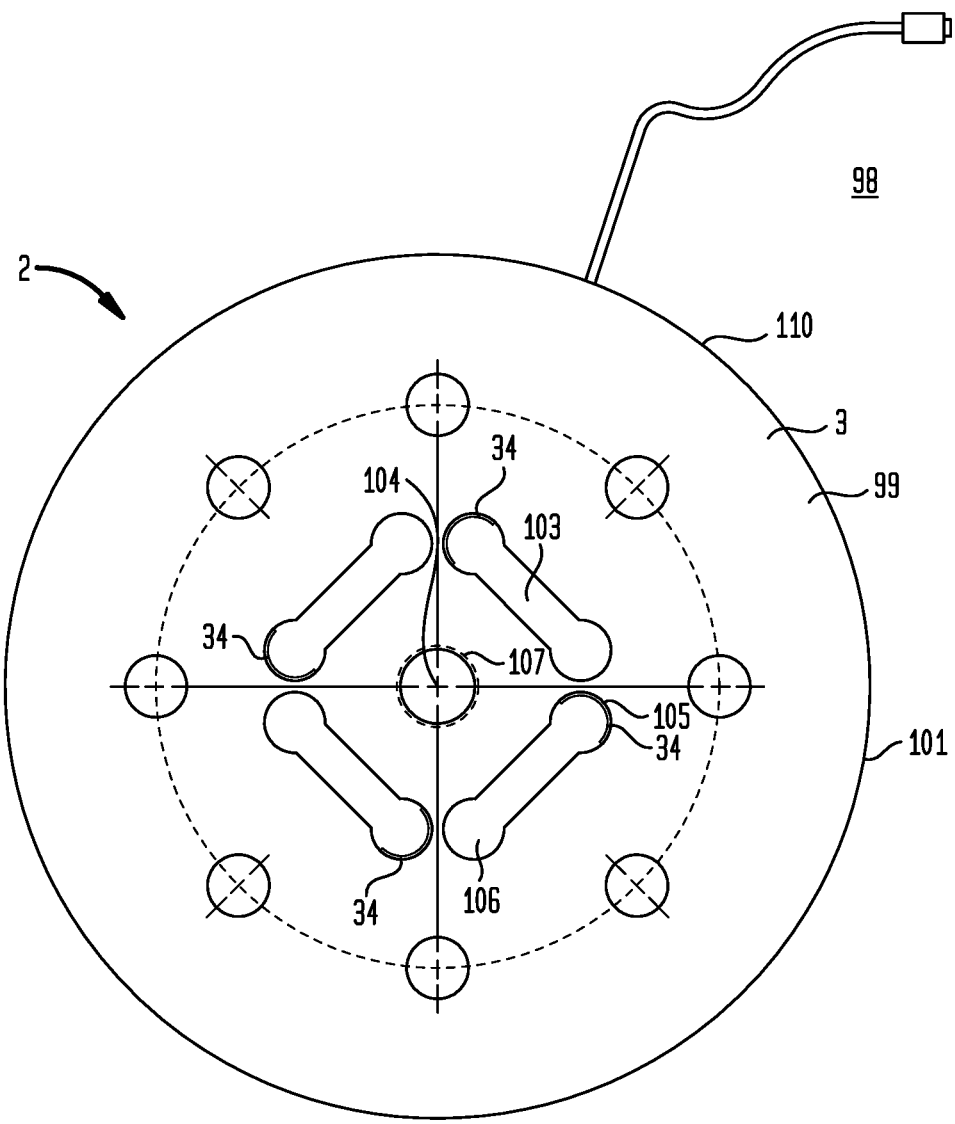
FIG. 11 is a top plan view of a particular embodiment of a load sensor.
Figure 12:
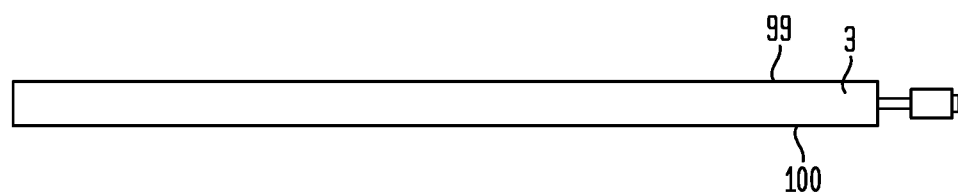
FIG. 12 is a side elevation view of a particular embodiment of a load sensor.

Now referring primarily to FIGS. 9 through 14, a numerous and wide variety of conventional air suspension assemblies (9) which do not contain a load sensor body (3) can be retrofit with a load sensor retrofit kit (98) (also referred to as the "kit"). The kit (98) can include a load sensor body (3) configured to be positioned between a conventional air suspension assembly (9) and the vehicle frame (5) or the vehicle suspension (8). Referring primarily to FIGS. 11 through 14, the load sensor body (3) can have a load sensor body first face (99) opposite a load sensor body second face (100). The load sensor body first face (99) can be configured to affix to the conventional air suspension assembly (9) and the load sensor body second face (100) can be configured to affix to a vehicle suspension (8) (as shown in the examples of FIGS. 9 and 10). In the illustrative example of FIGS. 9 and 10, the load sensor body second face (100) can be configured to be affixed to the suspension beam (22) of the vehicle suspension (8).

Now referring primarily to FIGS. 11 through 14, in particular embodiments, the load sensor body (3) configured to retrofit conventional air suspension assemblies (9) can include a generally flat load sensor body first face (99) opposite a generally flat load sensor body second face (100) joined a distance apart at a generally circular load sensor body perimeter (101). However, this illustrative example is not intended to preclude embodiments having a load sensor body first face (99) having a configuration other than generally flat to allow mated engagement with the surface of an air suspension assembly (9), and correspondingly is not intended to preclude embodiments having a load sensor body second face (100) having a configuration other than generally flat to allow mated engagement with the surface of the vehicle suspension (8), and correspondingly is not intended to preclude a configuration other than a generally circular load sensor body perimeter (10) to allow the load sensor body perimeter (10) to generally correspond to the contour of the air suspension assembly perimeter (102).

Again, referring primarily to FIGS. 11 through 14, the load sensor body (3) can further include one or a plurality of elongated slots (103) open at the load sensor body first face (99) and the load sensor body second face (100). In particular embodiments, a plurality of elongate slots (103) can be circumferentially arranged (in the illustrative example of FIG. 11 in a quadrilateral) about the center (104) of the load sensor body (3); although, in particular embodiments, the plurality of elongate slots (103) can extend radially outward proximate the center (104) of the load sensor body (3) A strain sensor (34) can be disposed proximate the elongate slot first end (105) or elongate slot second end (106) of each of the one or the plurality of elongated slots (103). The strain sensor (34) can generate a load signal (12) which varies based on the amount of deformation (also referred to as "strain" (45)) in or of the load sensor body (3) to the applied load (18).

As above described, the strain sensor (34) can comprise as illustrative examples a foil strain gauge arranged in a wheatstone bridge comprising a simple circuit for measuring an unknown resistance by connecting the unknown resistance to a quadrilateral with three known resistances and applying a voltage between a pair of opposite corners, or a piezoelectric crystal (39) or piezoelectric ceramic.

Again, referring primarily to FIGS. 9 through 14, in further particular embodiments, the load sensor body (3) can further include an aperture element (107) centrally disposed in the load sensor body (3). The aperture element (107) can permit a fastening member (108) to transverse the load sensor body (3) to affix the load sensor body (3) between the air suspension assembly (9) and the vehicle suspension (8). In particular embodiments, a fastening member (108) can extend from the air suspension assembly (9), through the aperture element (107) in the load sensor body (3), and into a fastener receiving element (109) disposed on the vehicle suspension (8). In particular embodiments, the fastener receiving element (109) can be disposed on the suspension beam (22) of the vehicle suspension (8); however this illustrative example is not intended to preclude other fastener configurations suitable to affix the load sensor body (3) between the air suspension assembly (9) and the vehicle suspension (8), such as a threaded bore (32) disposed in the air suspension assembly (9) and a threaded member (33) which passes through a fastener receiving element (109) of the vehicle suspension (8) and rotatingly engages the threaded bore (32).

Again, referring primarily to FIGS. 9 through 14, in further particular embodiments, the load sensor body (3) can include a plurality of aperture elements (107) disposed in spaced apart relation proximate the load sensor periphery (110). A plurality of fastener elements (67) can extend from the air suspension assembly (9), through a corresponding plurality of aperture elements (107), to affix the load sensor body (3) to the air suspension assembly (9), or into a corresponding plurality of fastener receiving elements (109) disposed on the vehicle suspension (8). In particular embodiments, the fastener receiving elements (109) can be disposed on the suspension beam (22) of the vehicle suspension (8).

In particular embodiments, the configuration of the load sensor body (3) shown in FIGS. 11 through 14, can, but need not necessarily be, retrofitted to conventional air suspension assemblies (9), but rather can be included as an integral part of an air suspension assembly (9) including a load sensor (2) which can be fitted between the vehicle frame (5) and the vehicle suspension (8).

Embodiments of the load sensor (2) shown in FIGS. 9 through 14 can be communicatively coupled (whether wired or wirelessly) to the load sensor computer (14) or the client computer (84) containing the load sensor program (17) including the load calculator (77) which can be executed to receive the load sensor signal (12) generated by the load sensor (2) and calculate the total force (80) in Newtons acting on the vehicle tire (81).

Figure 15:
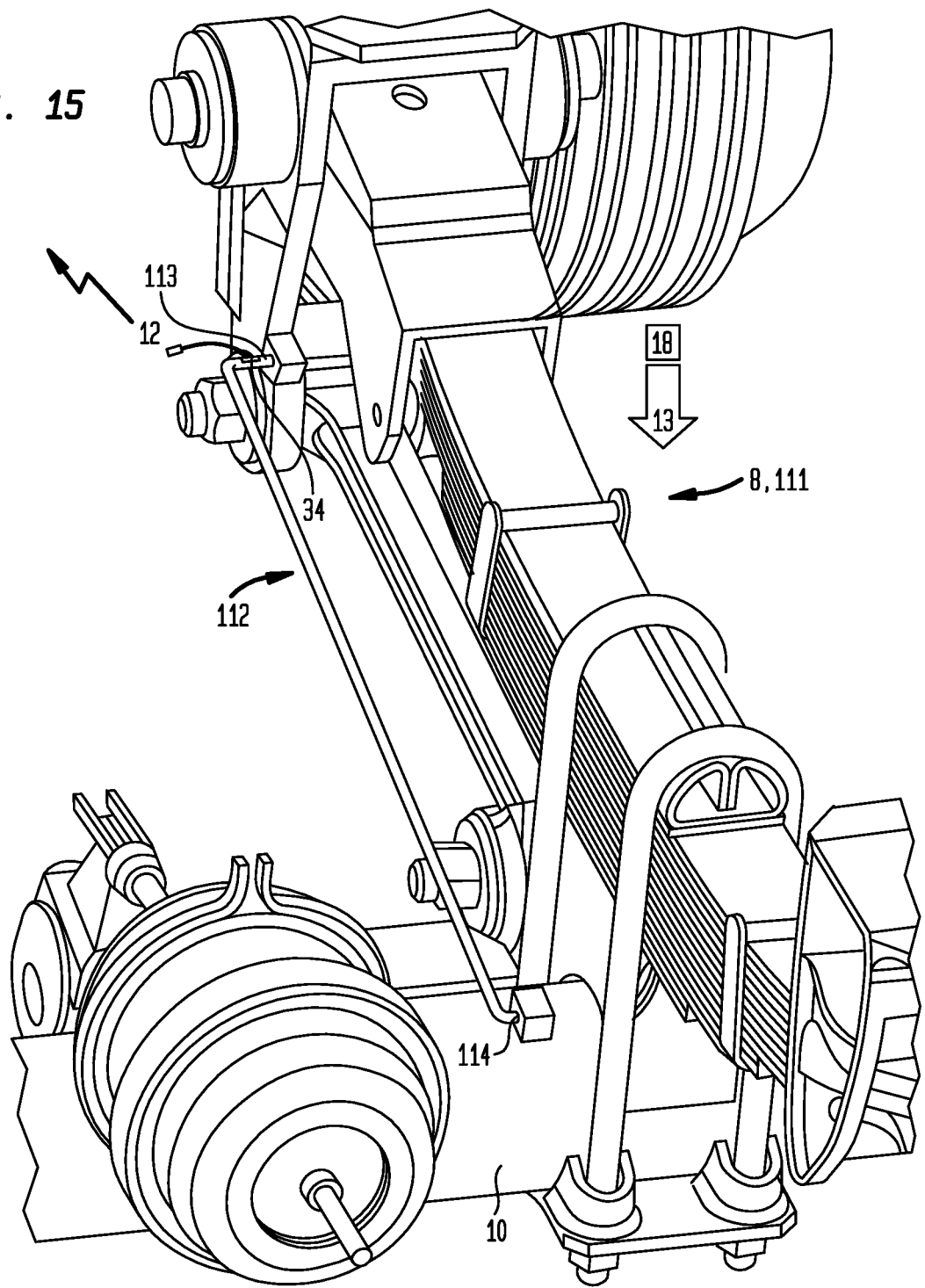
FIG. 15 is a perspective view of a particular embodiment of a torsion member coupled between a vehicle frame and a vehicle suspension.
Figure 16:
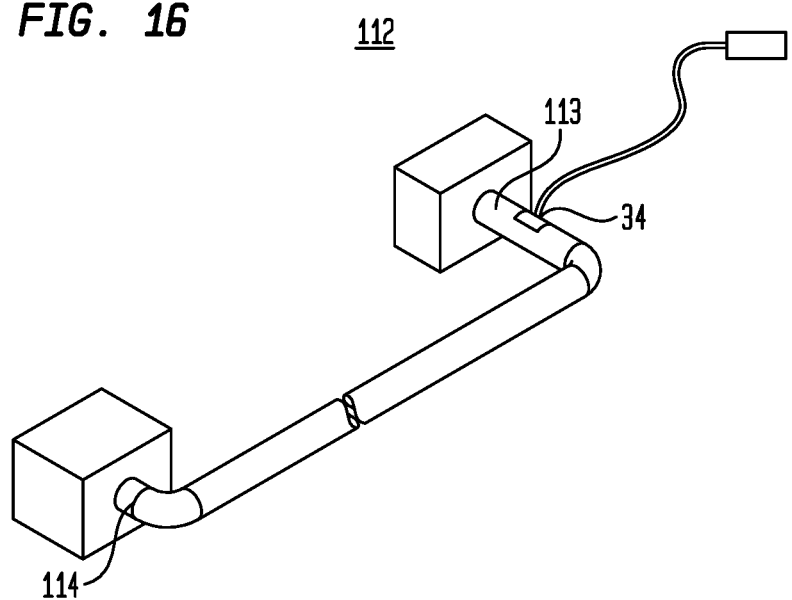
FIG. 16 is a perspective view of a particular embodiment of a torsion member.
Figure 17:
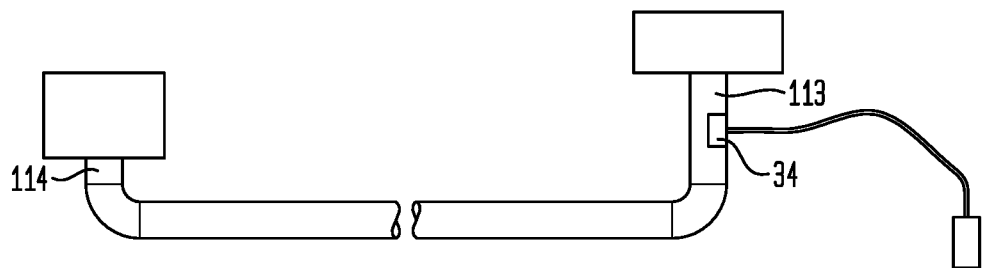
FIG. 17 is a top plan view of a particular embodiment of a torsion member.
Figure 18:
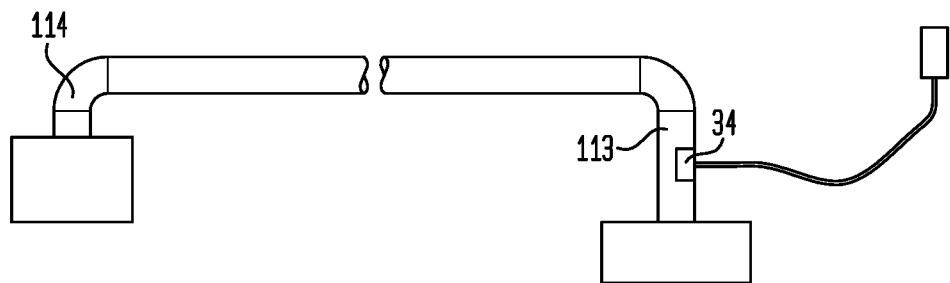
FIG. 18 is a bottom plan view of a particular embodiment of a torsion member.
Figure 19:
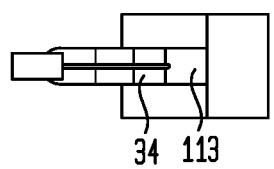
FIG. 19 is a first end elevation view of a particular embodiment of torsion member.
Figure 20:
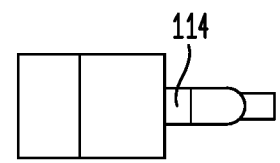
FIG. 20 is a second end elevation view of a particular embodiment of a torsion member.
Figure 21:
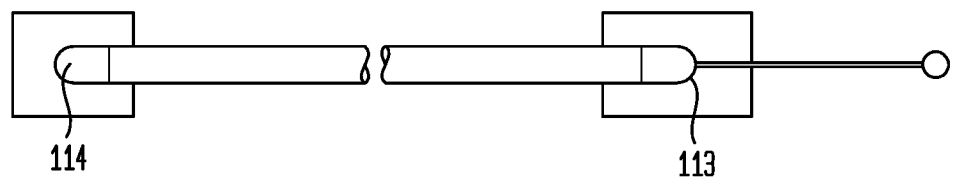
FIG. 21 is a first side elevation view of a particular embodiment of a torsion member.
Figure 22:
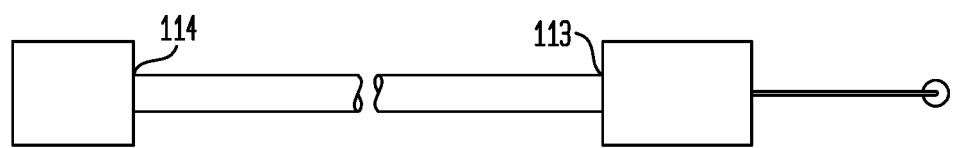
FIG. 22 is a second side elevation view of a particular embodiment of a torsion member.

Now referring primarily to FIGS. 15 through 22, in particular embodiments, the vehicle suspension (8) can include or further include a leaf-spring suspension (111) (as shown in the example of FIG. 15). Particular embodiments of the load sensor system (1) utilized with a leaf-spring suspension (111) can include one or a plurality of torsion members (112). The torsion members (112) can be coupled or responsive to the leaf-spring suspension (111) (as shown in the illustrative example of FIG. 15). The torsion member (112) can have a torsion member first end (113) and a torsion member second end (114). The torsion member first end (113) can be fixedly coupled to vehicle frame (5). The torsion member second end (114) can be rotationally coupled to the vehicle axle (10). A strain sensor (34) can be disposed on the torsion member (112). Typically, the strain sensor (34) can be comprise a strain gauge, or a piezoelectric crystal (39) or piezoelectric ceramic. The strain sensor (34) can generate a load sensor signal (12) which varies based on an amount of deformation of or in the torsion member (112) in response to an amount of force (13) transferred from the vehicle frame (5) through the torsion member (112) to the vehicle axle (10). Typically, the load sensor (2) can be disposed on the torsion member (112) proximate the torsion member first end (113). In response to a load (18) placed on the vehicle frame (5), the leaf-spring suspension (111) can deform in response to the force (13) transferred from the load (18) placed on the vehicle frame (5) to the leaf-spring suspension (111). The deformation of the leaf-spring suspension (111) results in corresponding movement of the axle (10) of the vehicle (6). The movement of the vehicle axle (10) in relation to the vehicle frame (5) can deform the torsion member (112). The deformation of the torsion member (112) can be sensed by the strain sensor (34) disposed on the torsion member (112). The strain sensor (34) correspondingly generates a load sensor signal (12). Embodiments of the load sensor (2) shown in FIGS. 15 through 22 can be communicatively coupled (whether wired or wirelessly) to the load sensor computer (14) or the client computer (84) containing the load sensor program (17) including the load calculator (77) which can be executed to receive the load sensor signal (12) generated by the load sensor (2) and calculate the total force (80) in Newtons acting on the vehicle tire (81).

Now referring primarily to FIG. 24, a load sensor system (1) (also referred to as the "system") can be distributed on one or more servers (115) operably coupled to one or more client computing devices (116) by a public network (85), such as the Internet (117), a cellular-based wireless network(s) (118), or a local network) (individually or collectively the "network"). The client computing device (116) can include as illustrative examples: desktop computer devices, and mobile computer devices such as personal computers, slate computers, tablet or pad computers, cellular telephones, personal digital assistants, smartphones, programmable consumer electronics, or combinations thereof. The network (85) supports a load sensor program (17) (also referred to as the "program") accessible by browser based on-line processing or downloadable by the client computing devices (116) to enable client computing devices (116) to establish off-line wired or wireless connection with one or more load sensors (2) operable to sense a load (18) transferred from the vehicle frame (5) through the vehicle suspension (8) to a vehicle tire (81) and to provide the load sensor program (17) including a load calculator (77) operable by the client computing device (116) to receive load sensor data (97) or calculated load force (13) from each load sensor (2) and to further calculate the total load (18) exerted on the vehicle frame (5).

Again, referring generally to FIGS. 1 through 24, particular methods of using a load sensor system (1) can further include one or more of: disposing a load (18) on a vehicle (6), sensing the load (18) disposed on the vehicle by operation of one or more load sensors (2) coupled between the vehicle frame (5) and the vehicle suspension (8), generating a load signal (12) from each load sensor (2), and processing the load signal (12) received from each load sensor (2) by operation of a load sensor computer (14) communicatively coupled to the load sensor (2), calculating the load (18) sensed by each load sensor (2) by operation of a load sensor program (17) contained in a load sensor computer non-transitory computer readable medium (16); transmitting calculated load (18) associated with each load sensor (2) to a central computer (84); processing the calculated load (18) associated with each load sensor (2) by operation of the load sensor program (17) contained in the central computer non-transitory computer readable memory (94) containing the load sensor program (17); and calculating the total load (18) disposed on the vehicle frame (5).

As can be easily understood from the foregoing, the basic concepts of the present invention may be embodied in a variety of ways. The invention involves numerous and varied embodiments of a load sensory system and methods for making and using such load sensor system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "signal" should be understood to encompass disclosure of the act of "signaling"—whether explicitly discussed or not—and, conversely, were there effectively disclosure of the act of "signaling", such a disclosure should be understood to encompass disclosure of a "signal" or even a "means for signaling." Such alternative terms for each element or step are to be understood to be explicitly included in the description.

In addition, as to each term used, it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the load sensor systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A retrofit load sensor kit, comprising:
   a load sensor body having a first face opposite a second face, said first face configured to affix to a vehicle air suspension assembly, said second face configured to affix to a vehicle suspension;
   an elongate slot disposed in said load sensor body; and
   a force measurement sensor disposed proximate an elongate slot first end or an elongate slot second end of said elongate slot, said force measurement sensor capable of generating a load signal which varies based on an amount of strain in said load sensor body,
      said load sensor body having a centrally disposed aperture element through which a fastening element of said vehicle air suspension assembly passes to affix said load sensor body to said vehicle suspension.

2. The kit of claim 1, further comprising a plurality of aperture elements disposed in spaced apart relation proximate a load sensor body periphery through which a corresponding plurality of fastening elements of said vehicle air suspension pass to affix said load sensor body to said vehicle air suspension assembly.

3. The kit of claim 1, wherein said elongate slot comprises a plurality of elongate slots circumferentially arranged about a center of said load sensor body.

4. The kit of claim 1, further comprising a processor communicatively coupled to a non-transitory memory element containing load sensor program including:
   a load calculator executable to receive said load signal generated by said force measurement sensor coupled to said load sensor body; and
   calculate a load exerted from said vehicle frame to said vehicle suspension based on said signal generated by said force measurement sensor.

5. A method, comprising:
   disposing an elongate slot in a load sensor body, said load sensor body having a first face opposite a second face;
   configuring said first face to affix to a vehicle air suspension assembly;
   configuring said second face to affix to a vehicle suspension;
   disposing a force measurement sensor proximate an elongate slot first end or an elongate slot second end of said elongate slot, said force measurement sensor capable of generating a load signal which varies based on an amount of strain in said load sensor body, centrally disposing an aperture element in said load sensor body through which a fastening element of said vehicle air suspension assembly passes to affix said load sensor body to said vehicle suspension.

6. The method of claim 5, further comprising disposing a plurality of aperture elements in spaced apart relation proximate a load sensor body periphery through which a corresponding plurality of fastening elements of said vehicle air suspension pass to affix said load sensor body to said vehicle air suspension assembly.

7. The method of claim 5, wherein said elongate slot comprises a plurality of elongate slots circumferentially arranged about a center of said load sensor body.

8. The method of claim 5, further comprising communicatively coupling a processor to a non-transitory memory element containing load sensor program including:
   a load calculator executable to receive said load signal generated by said force measurement sensor coupled to said load sensor body; and
   calculate a load exerted from said vehicle frame to said vehicle suspension based on said signal generated by said force measurement sensor.

* * * * *